Aug. 13, 1957  L. R. PARSONS  2,802,227
PRUNE TRAY CLEANER
Filed Dec. 18, 1953  3 Sheets-Sheet 1

INVENTOR.
Leonard R. Parsons
BY Victor J. Evans & Co.
ATTORNEYS

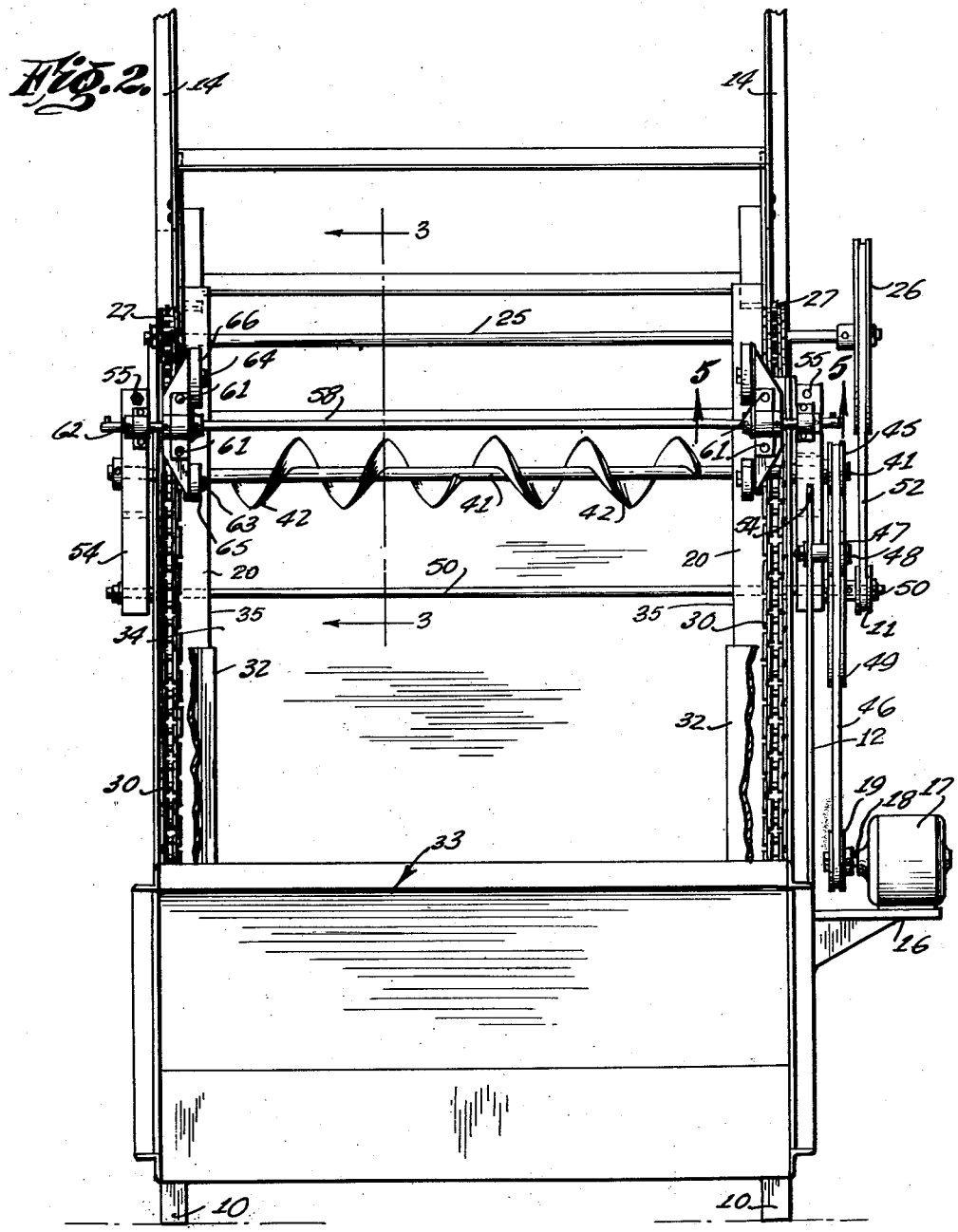

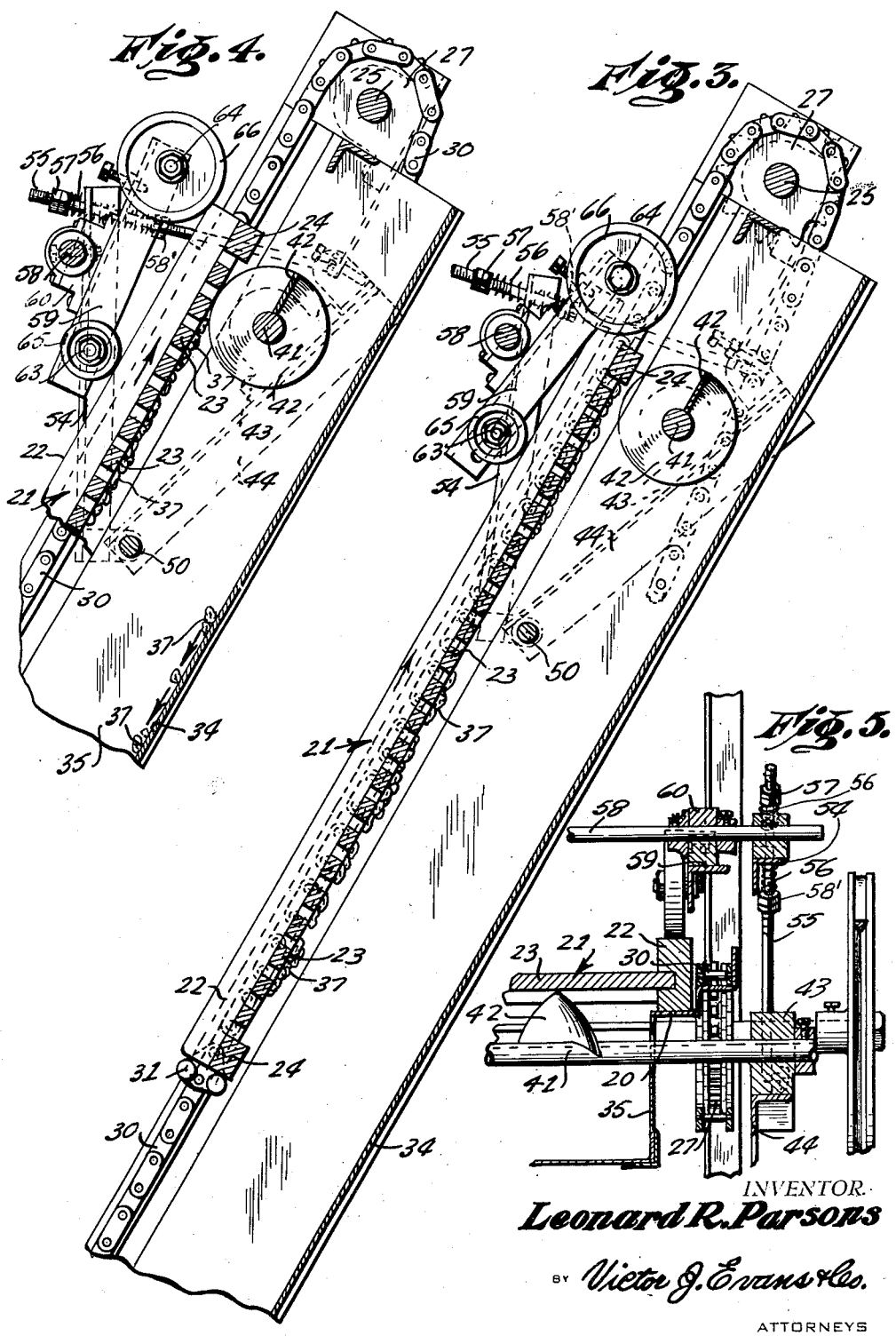

2,802,227

PRUNE TRAY CLEANER

Leonard R. Parsons, Yuba City, Calif.

Application December 18, 1953, Serial No. 398,942

1 Claim. (Cl. 15—93)

This invention relates to a tray cleaning machine, and more particularly to a machine for cleaning or removing dried fruit such as prunes from drying trays.

The object of the invention is to provide a machine which will automatically and quickly clean away remaining material such as dried prunes from trays.

Another object of the invention is to provide a prune cleaning machine which will automatically clean a plurality of trays and cause the cleaned prunes which adhere to the trays to be deposited in a suitable receptacle or location, the cleaned trays being ejected or discharged from the machine in an upright position.

A further object of the invention is to provide a tray cleaning machine which is extremely simple and inexpensive to manufacture.

Other objects and advantages will be apparent during the course of the following description.

In the accompanying drawings, forming a part of this application, and in which like numerals are used to designate like parts throughout the same:

Figure 2 is a front elevational view of the prune tray cleaning machine of the present invention, with parts broken away and in section.

Figure 3 is a fragmentary sectional view taken through the machine showing one of the trays beginning to actuate the scraping or cleaning mechanism, and taken on line 3—3 of Figure 2.

Figure 4 is a view similar to Figure 3 but showing the tray passing through the machine whereby the spiral scraper blade is caused to be moved into engagement with the tray to remove the prunes therefrom.

Figure 5 is a sectional view taken on the line 5—5 of Figure 2.

Figure 1:
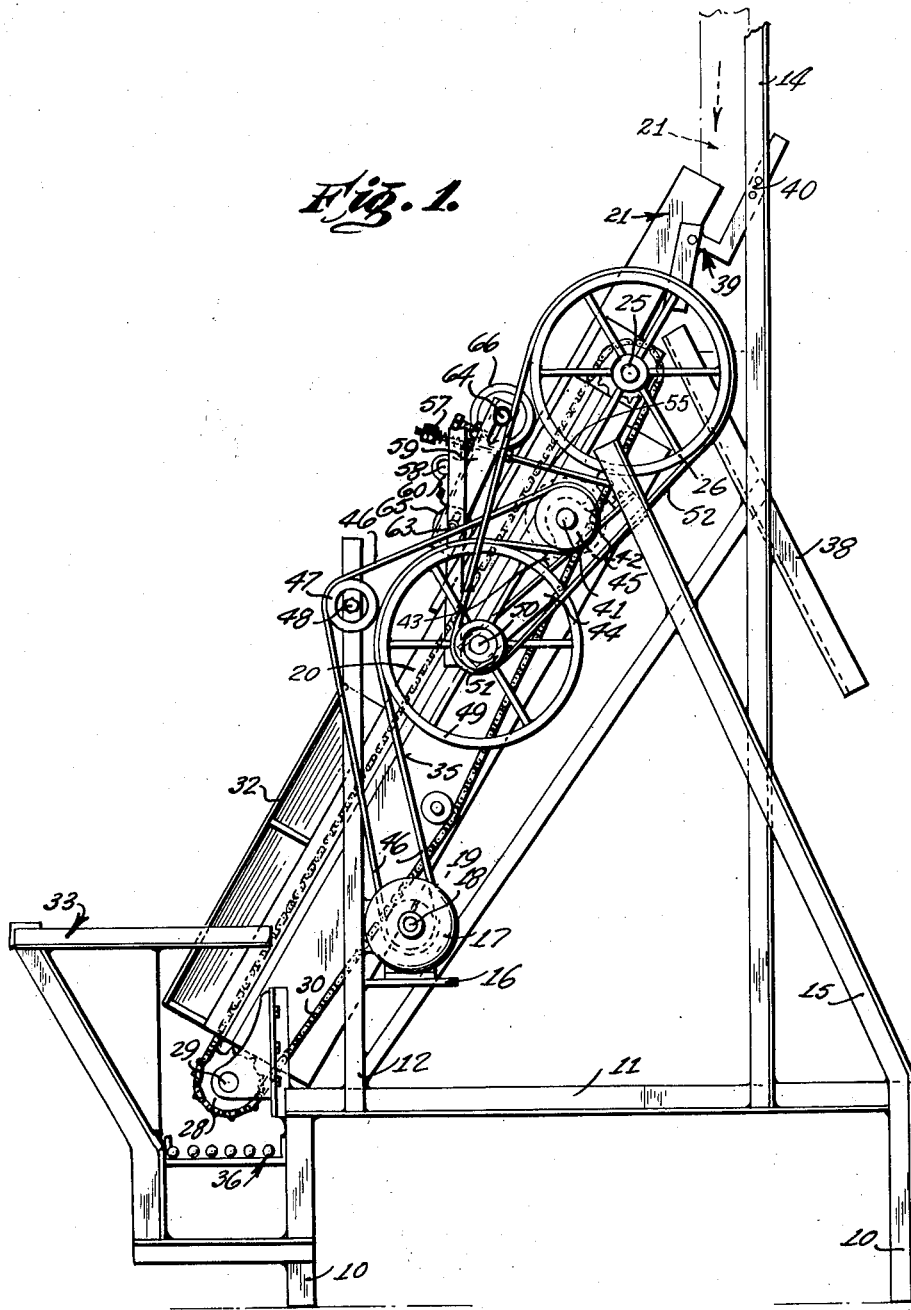
Figure 1 is a side elevational view of the prune tray cleaning machine, constructed according to the present invention.

Referring in detail to the drawings, the numeral 10 designates vertically disposed spaced parallel legs which can be made of any suitable material such as angle iron, and the legs 10 form part of a base. Extending between the upper ends of the legs 10 and secured thereto are horizontally disposed beams 11, and extending upwardly from the beams 11 and secured thereto are a plurality of spaced apart uprights 12, 14 and 15, Figure 1. Supported by the upright 12 is a shelf 16, and mounted on the shelf 16 is a motor 17 which is adapted to be connected to a suitable source of electrical energy. The motor 17 drives a shaft 18 which has a pulley 19 mounted thereon.

Supported by the frame of the machine is a pair of spaced parallel inclined guide rails 20 which slidably support the prune trays 21 which are to be cleaned. The trays 21 are of conventional construction and each includes side pieces 22 and cross slats 23 which are arranged in spaced parallel relation with respect to each other. The trays 21 further include end pieces 24 which are of greater thickness than the cross slats 23, Figures 3 and 4.

Supported by the upper portion of the frame is a horizontally disposed drive shaft 25 which has a pulley 26 mounted on an end thereof, Figure 2. A pair of sprockets 27 are also mounted on the drive shaft 25. The sprockets 27 have trained thereover a pair of endless spaced parallel chains 30 which form part of a conveyor, and the chains 30 are trained over lower sprockets 28 which are mounted on shafts 29, Figure 1. A plurality of lugs 31 are secured to each of the chains 30, and the lugs 31 are adapted to engage the lower or rear surface of each of the trays 21 to thereby advance the trays 21 through the machine when the motor 17 is actuated.

Side walls 32 may be provided adjacent the lower front portion of the machine so as to guide the trays 21 onto the conveyor chains 30 so that the trays can be moved up through the machine. A rack 33 is arranged adjacent the front of the machine for supporting the trays before they are fed into the machine by an operator, and an inclined platform 34 is arranged below the guide rails 20. The platform 34 receives the prunes 37 which are removed from the trays 21, and these prunes 37 fall by gravity down along the platform 34 onto a suitable receiving mechanism 36, Figure 1. If desired the prunes can be collected in a suitable receptacle located on the mechanism 36 or an additional conveyor can be arranged to carry away the prunes from the mechanism 36 to any desired location. The platform 34 may be supported below the guide rails 20 through the medium of side walls or sections 35.

A means is provided for setting the trays 21 right side up after they have been cleaned and after they pass through the machine. This means comprises a pair of inclined guide members 38 which are arranged angularly with respect to the uprights 14, Figure 1. It will be seen that the top of each of the rails 20 terminates short of the upright 14 to provide a space therebetween. Thus, as the trays 21 move through the machine they move from the solid line position of Figure 1 to the broken line position of Figure 1 so that after the trays have been cleaned they will be able to slide down the guide members 38 to any suitable receptacle or location. Brackets 39 are secured to the upright 14 in any suitable manner as for example by rivets or bolt and nut assemblies 40, and these brackets 39 serve to guide the cleaned trays 21 onto the guide members 38.

There is provided a mechanism for cleaning or scraping the dried prunes 37 which adhere to the surface of the trays 21. This cleaning mechanism includes a horizontally disposed axle 41 that has spiral blades 42 mounted thereon, Figure 5. The ends of the axle 41 are journaled in bearing blocks 43, and one of the bearing blocks 43 is secured to a bar 44 on each side of the frame. The bars 44 may be made of any suitable material such as angle iron, and the bars 44 are arranged below and outside of the guide rails 20 and the bars 44 are pivotally mounted on the shaft 50 which is journalled in the frame below the axle 41. A pulley 45 is mounted on an end of the axle 41, and an endless belt 46 is trained over the pulley 45. The belt 46 is also trained over a guide pulley 47 which is supported by an axle 48 on the upright 12, and this belt 46 is trained over the pulley 19 which is operated by the motor 17. The belt 46 also engages a portion of a pulley 49 that is mounted on a shaft member 50, and the shaft member 50 has secured thereto a smaller pulley 51 which has an endless belt 52 trained thereover. The belt 52 is trained over the larger pulley 26, Figure 1, and the pulley 26 is mounted on the drive shaft 25. Thus, it will be seen that actuation of the motor 17 causes rotation of the scraper member including the axle 41 and blades 42 and also causes actuation of the conveyor chains 30.

Mounted in opposed relation to each of the bars 44 is a lever 54, Figure 5, and the levers 54 may also be made of angle iron. The rear ends of the levers 54 are pivotally connected to the shaft member 50 inwardly of the rear ends of the bars 44, Figures 3 and 4, and bolts 55 interconnect or extend between the bar 44 and the lever 54 thereabove, Figure 5. Coil springs 56 are circumposed on the bolts 55 on opposite sides of the flanges on the levers 54, and nuts 57 and 58' are arranged in threaded engagement with the bolts 55 for adjusting the tension of the coil springs 56. Thus the adjustment of the nuts 57 on the bolts 55 tensions the springs 56 on the outer side of the flanges on the levers 54 to control the outward movement of levers 54 and the adjustment of the nuts 58' tensions the springs 56 on the inner side of the flanges on the levers 54 to control the inward movement of the levers 54.

Extending between the pair of levers 54 and connected thereto is a horizontally disposed rod 58, and the rod 58 extends through bearing blocks 60, and the bearing blocks 60 are secured to the upper surface of brackets 59 by means of bolt and nut assemblies 61. The ends of the rod 58 may be secured to the lever 54 by bolts 62. Carried by each of the brackets 59 is a pair of pins or axles 63 and 64, and a pair of rollers or wheels 65 and 66 are journaled on the axles 63 and 64, respectively. The wheel 66 is of greater diameter than the wheel 65. There are two of the wheels 66 and two of the wheels 65 in the machine of the present invention. Thus, as the tray 21 is advanced through the machine by the conveyor chains 30, the end of the tray will first engage the wheels 65 and then move to the position shown in Figure 3. Then, continued movement of the trays through the machine causes the side pieces 22 of the trays 21 to engage under the wheels 66 as shown in Figures 4 and 5 and this causes the levers 54 to pivot outwardly on the shaft member 50. The bolts 55 being connected to the bars 44 will cause the bars 44 to pivot forwardly on the shaft member 50 and urge the scraper member including the axle 41 and blades 42 to move against the surface of the tray having the prunes 37 thereon so that this rotating blade 42 will scrape the prunes from the tray and cause the prunes to move onto the inclined platform 34 whereby they will be conveyed to any suitable receptacle or the like. After the trays have moved beyond the wheels 66 the cleaning mechanism will move back from the position shown in Figure 4 until the next tray actuates this mechanism, but as long as the tray 21 is in engagement with the wheels 66, the blades 42 will be maintained against the tray 21.

From the foregoing it is apparent that a machine has been provided which will automatically and continuously remove material from trays, such as dried prunes 37 that are stuck to the tray 21. In processing or drying material such as prunes, the prunes are disposed upon trays such as the trays 21 and then the prunes are subjected to a drying atmosphere and while the majority of the fruit on the trays can be readily removed by inverting or tipping the trays, some of the prunes or other fruit invariably adhere or stick to the trays and heretofore it has been a laborious and expensive job removing this fruit which is stuck to the trays. With the present invention a means has been provided for automatically and continuously removing such fruit.

In use the trays 21 to be cleaned are fed by hand between the side walls 32 onto the conveyor chains 30 whereby the lugs 31 engage behind the trays and move the trays upwardly and rearwardly through the machine. The conveyor chains 30 are actuated by the motor 17 and so are the scraper blades 42 and this actuation takes place through the belt drive shown in Figures 1 and 2. As the trays 21 are moved along the rails 20, the trays automatically move the scraper blades 42 into engagement with the side of the trays having the prunes thereon. Thus, the upper end of the tray first engages the two lift wheels 65 and then moves the parts to the position shown in Figure 3 and continued movement of the tray lifts the wheels 66 by reason of the pivoted action of the brackets 59. The resultant pivoted movement of the levers 54 pivots the bars 44 by reason of the bolts 55 to move the blades 42 into engagement with the tray 21 so that the prunes 37 are removed. The scraper blades 42 are held against the tray as long as the tray is beneath the wheel 66 as shown in Figures 4 and 5 so that the entire tray is scraped. As soon as the tray passes the wheels 66, the wheels 66 and blades 42 drop back until the next tray actuates the cleaning mechanism. The trays 21 leave the machine right side up due to the provision of the guide members 38 which are arranged angularly adjacent the rear portion of the machine.

The trays 21 are made of wooden slats 23 which are higher at the ends 24 and sides 22 to keep the fresh prunes from rolling off the trays when they are dehydrated. The trays are pushed onto the machine upside down, and the rollers 65 and 66 keep the trays from bouncing away from the scraper blades 42. After the trays leave the machine they can be carried to a washer or stacker. The screw 42 is one-half of a right hand thread and one-half left hand thread so that they both scrape to the middle of the pan or tray. The present invention can be operated by one man and the machine will not readily get out of order. The bolts 55 raise the bars 44 which lift the scraper blades up when the tray moves under the wheels 66. The bolts 55 extend between the bars 44 and 54 as shown in Figure 5, and by adjusting the nuts 57 and 58', the tension on the coil springs 56 can be regulated or adjusted as desired.

I claim:

In a prune tray cleaning machine, a base embodying a plurality of vertically disposed spaced parallel legs, horizontally disposed beams extending between said legs and secured thereto, a frame supported on said base and including spaced apart uprights extending upwardly from said beams and secured thereto, a pair of spaced parallel inclined guide rails supported by said frame, said guide rails serving to slidably support trays to be cleaned, an inclined platform supported below said rails for receiving prunes cleaned from said trays, a support member supported by said base for receiving the prunes from the lower end of said platform, a shelf supported by one of said uprights, a motor supported by said shelf and adapted to be connected to a source of electrical energy, a drive shaft supported in the upper portion of said frame, a first pair of sprockets mounted on said drive shaft, a second pair of sprockets supported by the lower portion of said frame, a pair of spaced parallel chains trained over said sprockets and arranged contiguous to the exterior of said guide rails, lugs projecting from said chains for engaging the lower surface of said trays for moving the trays up along the rails, a first shaft member mounted on said frame below said drive shaft, belt and pulley means connecting said drive shaft to said first shaft member, an axle mounted on said frame intermediate of said drive shaft and said first shaft member, a motor shaft member driven by said motor, belt and pulley means connecting said first shaft member and said axle to said motor shaft member, a cleaning mechanism for removing dried prunes from the trays, means for setting the trays right side up after they have been cleaned and said last named means comprising a pair of guide members arranged angularly with respect to said uprights, brackets for guiding said trays onto said guide members, said cleaning mechanism comprising spiral blades mounted on said axle for movement into and out of engagement with said trays, bars pivotally mounted on said first shaft member for supporting said axle and a plurality of shiftable wheels selectively engaged by portions of said trays for selectively causing the blades on said axle to move against the surface of the tray.

References Cited in the file of this patent

UNITED STATES PATENTS

| | | |
|---|---|---|
| 876,336 | Cutler | Jan. 14, 1908 |
| 1,615,727 | Smith | Jan. 25, 1927 |
| 2,428,855 | Sanders et al. | Oct. 14, 1947 |
| 2,453,339 | Peterson | Nov. 9, 1948 |
| 2,549,062 | Davis | Apr. 17, 1951 |